2 Sheets--Sheet 1.

B. McGRODER & H. TIEDEMANN.
Wrecking Apparatus.

No. 142,712. Patented September 9, 1873.

Witnesses,
A. F. Connell
F. Leonard

Inventor,
B. McGroder
H. Tiedemann
Per Burridge & Co.

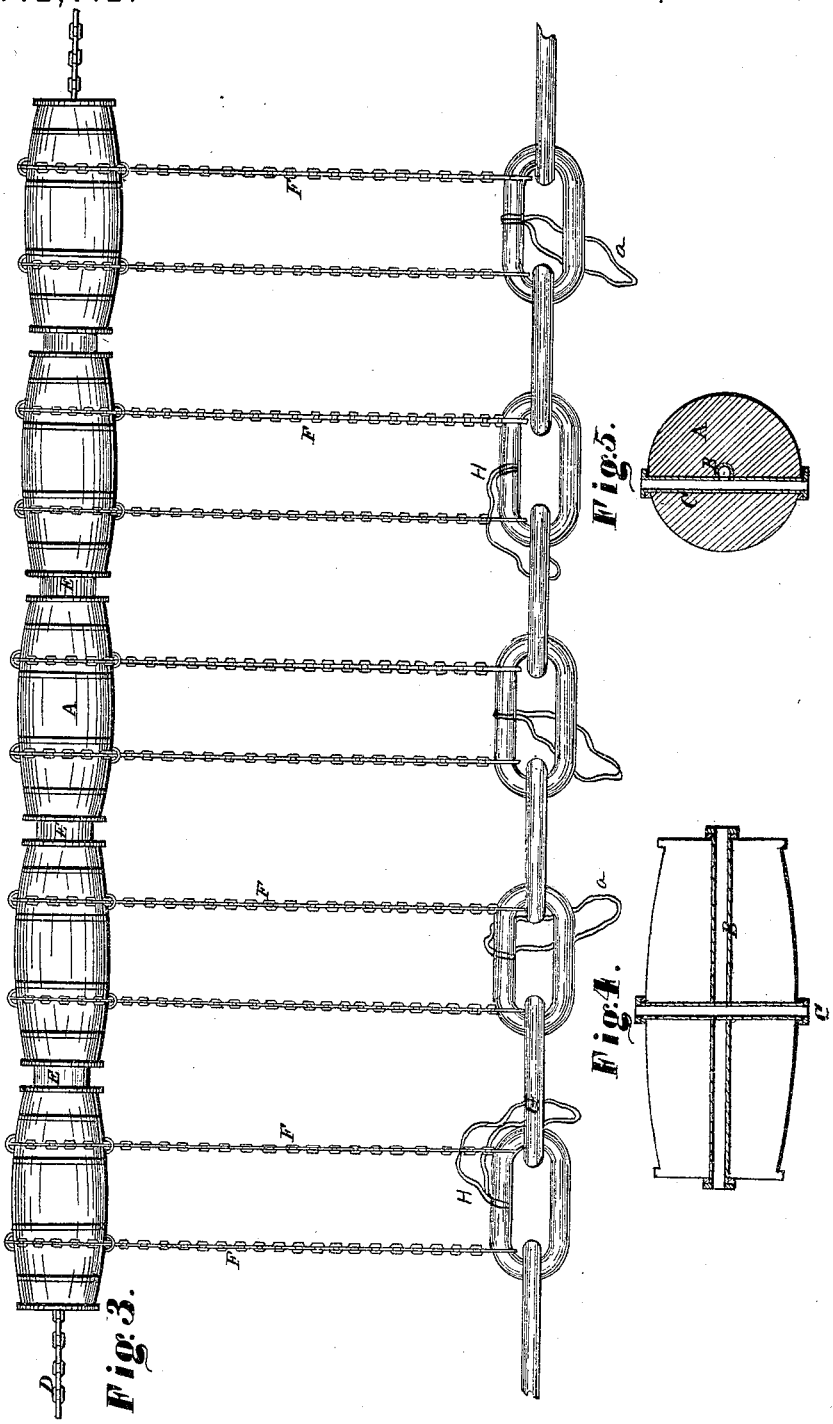

UNITED STATES PATENT OFFICE.

BERNARD McGRODER AND HANNES TIEDEMANN, OF CLEVELAND, OHIO.

IMPROVEMENT IN WRECKING APPARATUS.

Specification forming part of Letters Patent No. 142,712, dated September 9, 1873; application filed June 25, 1873.

*To all whom it may concern:*

Be it known that we, BERNARD McGRODER and HANNES TIEDEMANN, of Cleveland, in the county of Cuyahoga and State of Ohio, have invented new and useful Improvements in Wrecking Apparatus, of which the following is a complete description, reference being had to the accompanying drawings making part of the same.

Figure 1:
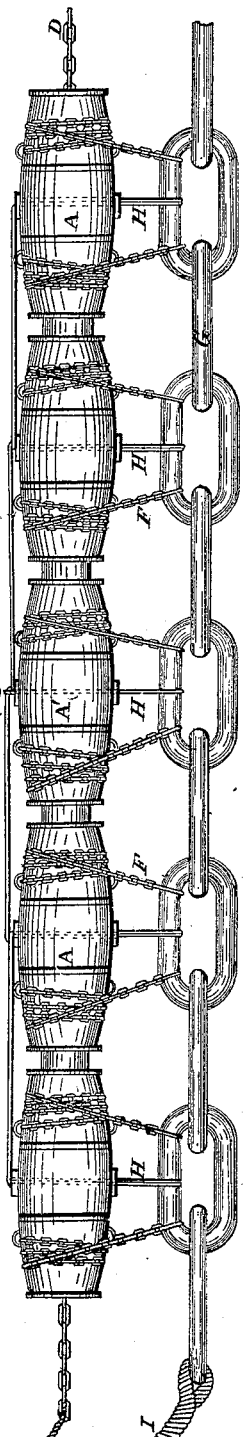
Figure 2:
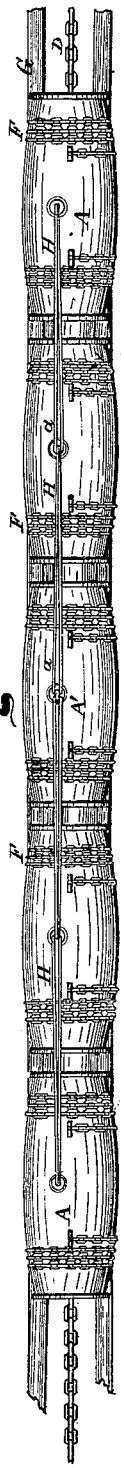

Figure 1 is a side view of the apparatus adjusted for lowering the cable. Fig. 2 is a top view of Fig. 1. Fig. 3 is a view of the apparatus having the cable lowered into the water. Figs. 4 and 5 are detached sections.

Like letters of reference refer to like parts in the several views.

The purpose of this invention is to be applied to raising sunken vessels from deep waters, the construction and operation of which, in detail, are as follows: The apparatus, in part, consists of a raft composed of a series of floats, A, which may be more or less in number, as circumstances may require. Said floats, in shape, resemble a cask, longitudinally through the middle of which passes a tube, B, Fig. 4. The ends thereof are secured to the heads of the float in an air and water tight manner; also, transversely through each float passes a tube, C, which is also secured therein in a manner that shall be air and water tight. Said floats, when thus prepared, are strung upon a chain, D, in the order as shown in the drawings. Between the ends of the floats are interposed rubber rings E, whereby they are prevented from touching each other, and guarded from injury by collision. To the outside of each float are secured the ends of two chains, F, Fig. 3, whereas the opposite ends of the chains are attached to a cable, G; also, to the cable is secured one end of the ropes H, whereas the opposite ends thereof extend up to and through the floats A, passing through the tube C, as shown in Fig. 1. The upper end of each rope is formed into a loop, as seen at *a*, Fig. 2, whereby the several ropes are looped together. The ropes on each side of a certain float are looped toward said float, at which place they are secured from unlooping, for a purpose presently shown.

The practical operation of the above-described apparatus is as follows: The chains F are wound up around the floats, as shown in Fig. 1, thereby drawing up the cable G in close proximity to them, as shown in said Fig. 1. The cable is secured, in this relation, to the floats by means of the ropes H referred to, which, as above said, passes up through the floats, and, on the upper side thereof, they are looped into each other, as shown in Fig. 2, the looping being in the direction toward the middle float A'. This looping together of the ropes draws them tight, thereby suspending the cable from the floats by the ropes instead of the chains, and that in close proximity to them, as shown in Fig. 1. To each end of the cable is attached a hawser, I, whereby the cable is handled, and, in part, directed. The apparatus, when thus arranged, is towed to the wreck; the exact place of which being ascertained, the floats are then so arranged as to bring the cable near to one side of it, which is then dropped to the necessary depth to reach the hull by unfastening the ropes, whereby it is suspended at the middle float A', referred to. The ropes, being looped together, will now, by the weight of the cable, unloop at about one time, and permit the chains to unwind from the floats, and thereby allow the cable to sink to one side of the wreck. The sunken cable is now drawn tight around the hull by means of the hawser I, which, on being done, is thereby secured by a self-adjusting clutch arranged in connection with the cable for that purpose. The wreck, thus surrounded by the cable, is raised by sending down upon one of the chains F of each float—which is unhooked from the float for that purpose—one or more other floats, the same as those forming the raft whereby the cable was floated. Said floats are sunk by a weight attached thereto, which, when it has run down upon the chain far enough, is fastened by a clutch, and thereby retained below when the sinker is detached. By this means a number of floats are sunk all around the wreck by passing them down over the chains until a sufficient number has been let down to raise the wreck, which is then towed, thus buoyed up, to any desirable place.

It will be obvious that, by the above-described means, wrecks can be raised from great depths, and that, when the wreck is not raised to the surface, in consequence of the great length of chain required to reach it, the wreck can be floated by the buoys, thus partially raised, into shallow water, where the chains can be shortened up, and the vessel raised nearer to the surface, or above it, as the attachment of the floats or buoys thereto may be.

What we claim as our invention, and desire to secure by Letters Patent, is—

The ropes H, provided with loops $a$, in combination with the floats A, having transverse and longitudinal tubes B C, and cable G, constructed and arranged substantially as and for the purpose described.

BERNARD McGRODER.
HANNES TIEDEMANN.

Witnesses:
W. H. BURRIDGE,
WM. V. TOUSLEY.